UNITED STATES PATENT OFFICE.

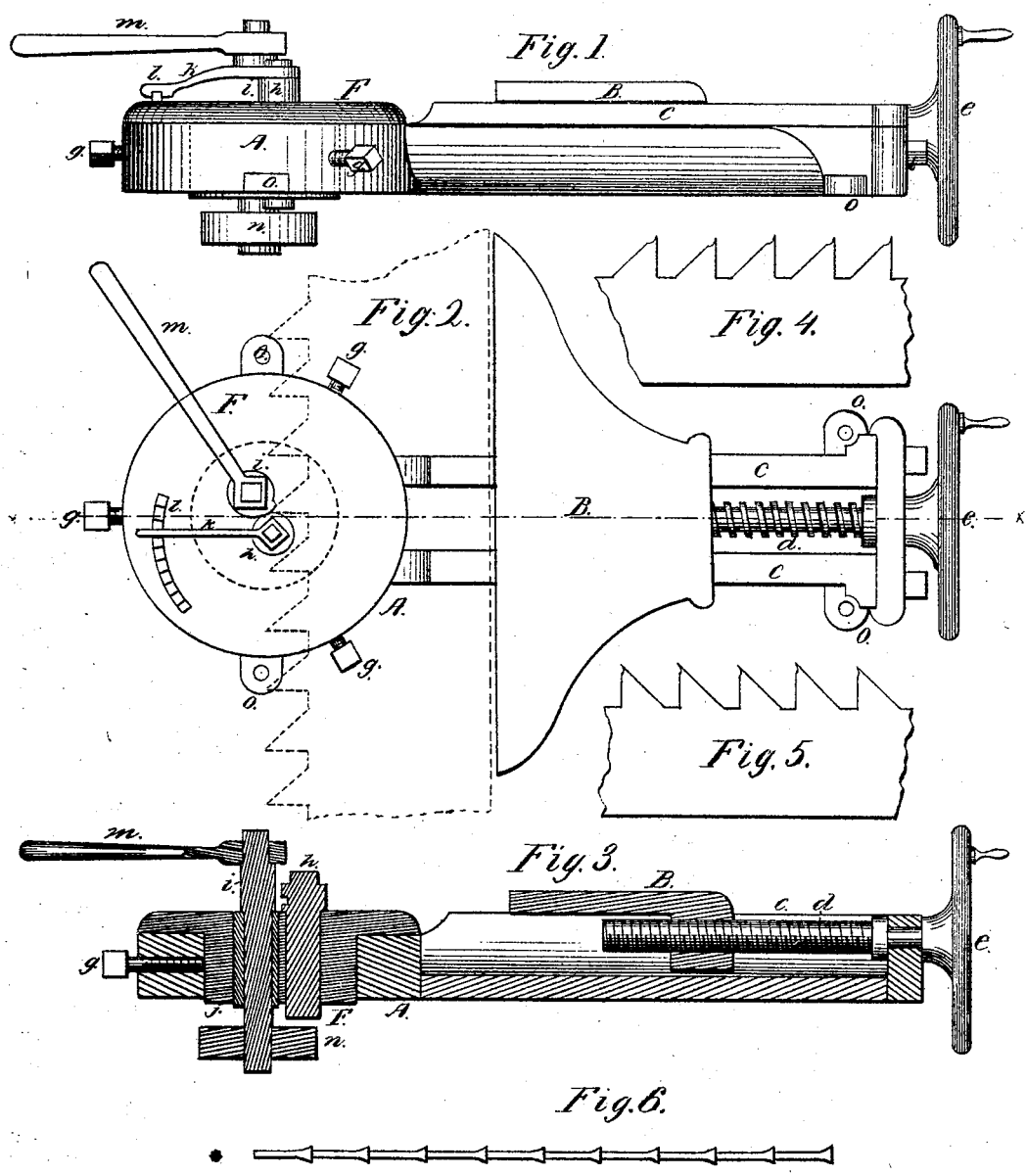

GUSTAVUS A. PRESCOTT, OF SANDY HILL, NEW YORK.

IMPROVEMENT IN SAW-SWAGING MACHINES.

Specification forming part of Letters Patent No. 135,361, dated January 28, 1873.

*To all whom it may concern:*

Be it known that I, GUSTAVUS A. PRESCOTT, of Sandy Hill, county of Washington, State of New York, have invented certain Improvements in Saw-Tooth Swage, of which the following is a specification:

My invention relates to the construction and form of dies and the manner of operating the same for the purpose of swaging and spreading the points of saw-teeth to uniform shape and thickness with a small amount of labor and a saving of saws.

Figure 1 is a side elevation of a machine embodying my invention. Fig. 2 is a plan of the same. Fig. 3 is a vertical longitudinal section passing through the center on the line $x$ $x$, Fig. 2. Fig. 4 is a saw with the teeth swaged on the upper side; Fig. 5 with the teeth swaged on the under side. Fig. 6 is a view of the saw, looking on the edge, showing the way in which the points of the teeth are spread after being swaged.

A is the body or stock of the machine which may be made of cast-iron, or any other suitable material. B is the rest or follower, which is gibbed to and made to slide on ways $c$ $c$, by means of screw $d$ and hand-wheel $e$. F is an adjustable rotary head, which, being turned to any required position, is held fast by means of set-screw $g$ $g$ $g$. The object is to adjust the dies to work in any position or part of the tooth required, so as to make a long or short upset; to work on the under side of the tooth, thereby giving the greatest width and better cutting form to the teeth and wear to the saw, or by reversing the position of the saw to work on the upper side, as different saws may require. $h$ is a die having a suitable notch or slot in which one edge of the saw-tooth rests to prevent the tooth from bending or kinking while the other side at the point receives the pressure of the cam $i$ while being swaged. $i$ is an eccentric or scroll cam, the bearing of which passes through an eccentric steel or other metal thimble, $j$, which turns in head F. The object of the eccentric thimble is to adjust the die $h$ and cam $i$ to a proper distance from each other. $k$ is a lever attached to top of die $h$ and made to spring into a notch in tooth-rack $b$ when turned to its required position. $m$ is a lever attached to the top of scroll-cam $i$ for the purpose of working it by hand. $n$ is a pulley attached to the lower end of $i$ for the purpose of operating it by power. $o$ $o$ $o$ $o$ are lugs, by which the machine is bolted to the bench or frame.

The saw to be swaged is placed in the machine, as shown by dotted lines in Fig. 2, and held to its place by follower B, one side of the tooth fitting in the notch $h$, while the eccentric or scroll cam $i$ is made to rotate by means of lever $m$ or pulley $n$, producing a powerful pressure on the tooth, thus flattening and spreading the point of the tooth sufficient for the saw to pass freely through the timber without friction.

Having thus described my invention, what I claim as new, and desire to secure by Letters Patent, is—

1. A rotating head or other suitable device for holding the dies, so that they can be adjusted to any desired position, as set forth.

2. In a saw-swaging device, the eccentric thimble $j$ for adjusting the distance between the dies, as specified.

3. The rotary head F provided with the dies and the thimble $j$, in combination with the frame A and follower B, substantially as set forth.

GUSTAVUS A. PRESCOTT.

Witnesses:
NELSON R. BROMLEY,
JAMES E. DE GRUGH.